(12) United States Patent
Hooper

(10) Patent No.: US 12,433,281 B1
(45) Date of Patent: Oct. 7, 2025

(54) SYSTEMS AND METHODS FOR MONITORING FISHING LURES COUPLED TO A MARINE VESSEL

(71) Applicant: Navico, Inc., Tulsa, OK (US)

(72) Inventor: Mathew J. Hooper, Auckland (NZ)

(73) Assignee: Navico, Inc., Tulsa, OK (US)

( * ) Notice: Subject to any disclaimer, the term of this patent is extended or adjusted under 35 U.S.C. 154(b) by 183 days.

(21) Appl. No.: 17/720,476

(22) Filed: Apr. 14, 2022

(51) Int. Cl.
*A01K 97/12* (2006.01)

(52) U.S. Cl.
CPC .................................. *A01K 97/125* (2013.01)

(58) Field of Classification Search
CPC ...... A01K 97/125; A01K 97/00; A01K 91/18; A01K 99/00; A01K 91/20; B63B 34/05; B63B 35/14; B63B 35/00; B63B 49/00; G01C 21/00; G01S 15/96; G01S 13/88; G01S 19/51; G01S 19/42; G01S 7/10; G01S 5/30
USPC .................. 43/6.5, 4.5, 17; 701/21; 715/771
See application file for complete search history.

(56) References Cited

U.S. PATENT DOCUMENTS

| | | | | |
|---|---|---|---|---|
| 4,752,878 A * | 6/1988 | Sigurdsson | .......... | A01K 89/017 43/4.5 |
| 4,793,088 A * | 12/1988 | Fortuna | .................. | A01K 91/08 43/26.1 |
| 5,581,930 A | 12/1996 | Langer | | |
| 7,082,355 B1 * | 7/2006 | Jacobson | ................ | B63B 49/00 340/985 |
| 8,267,031 B2 * | 9/2012 | Austad | ..................... | G01V 1/38 114/244 |
| 8,437,509 B1 * | 5/2013 | Hallenborg | ............ | G06V 20/13 382/107 |
| 9,137,977 B2 | 9/2015 | Davidson | | |
| 10,054,684 B2 | 8/2018 | Laster | | |
| 10,719,077 B2 | 7/2020 | Clark et al. | | |
| 11,000,021 B2 | 5/2021 | Laster et al. | | |
| 2012/0275265 A1 * | 11/2012 | Nielsen | ................. | B63B 27/146 367/20 |
| 2012/0287751 A1 * | 11/2012 | Elvestad | .................. | G01V 1/38 367/16 |
| 2013/0033960 A1 * | 2/2013 | McKey, III | .......... | G01V 1/3808 367/16 |

(Continued)

OTHER PUBLICATIONS

"Tackobox Smart Connect Outdoor Bluetooth Fishing Reel" accessed from https://www.smartconnectoutdoor.com/services on Mar. 31, 2022.

(Continued)

*Primary Examiner* — Zoe Tam Tran
(74) *Attorney, Agent, or Firm* — Andrus Intellectual Property Law, LLP

(57) ABSTRACT

A method for monitoring a fishing lure coupled to a marine vessel via a line. The method includes receiving a position with respect to the marine vessel in which the fishing lure is coupled to the marine vessel via the line. The method further includes receiving a line length of the line extending between the marine vessel and the fishing lure when the fishing lure is in use outside the marine vessel. The method further includes generating a graphic display on a display device, wherein the graphic display depicts the position of the line coupling the fishing lure to the marine vessel, and wherein the graphic display indicates the line length extending between the marine vessel and the fishing lure.

16 Claims, 13 Drawing Sheets

(56) References Cited

U.S. PATENT DOCUMENTS

| | | | |
|---|---|---|---|
| 2014/0013259 A1* | 1/2014 | Thomas | G06F 3/0488 |
| | | | 715/771 |
| 2014/0269179 A1* | 9/2014 | Poulton | G01V 1/3808 |
| | | | 367/20 |
| 2014/0358483 A1* | 12/2014 | da Rosa | A01K 97/00 |
| | | | 702/188 |
| 2016/0245649 A1 | 8/2016 | Laster et al. | |
| 2016/0353725 A1* | 12/2016 | Worley, III | A01K 87/007 |
| 2018/0288990 A1 | 10/2018 | Laster et al. | |
| 2018/0295829 A1* | 10/2018 | Blackadar | G06N 5/04 |
| 2019/0072951 A1* | 3/2019 | Clark | A01K 91/06 |
| 2019/0120959 A1* | 4/2019 | Laster | G01S 15/86 |
| 2020/0026417 A1* | 1/2020 | Corbett | H04M 1/18 |
| 2020/0113162 A1* | 4/2020 | Hamade | A01K 79/00 |
| 2020/0341463 A1 | 10/2020 | Clark et al. | |
| 2021/0078682 A1* | 3/2021 | Schmidt | B63B 79/40 |
| 2021/0227815 A1 | 7/2021 | Laster et al. | |
| 2021/0231428 A1* | 7/2021 | Silkworth | H04M 1/72403 |
| 2022/0214171 A1* | 7/2022 | Johnson | B63B 79/40 |

OTHER PUBLICATIONS

"Anglr Live for the Water & Unlock Your Fishing Potential" accessed from https://www.anglr.com/ on Mar. 31, 2022.

"Abu Garcia Virtual Casting Rod" accessed from https://www.abugarcia.com/products/virtual-casting-rod-1523068 on Mar. 31, 2022.

"Cirago iFisher Bluetooth Smart Fishing Bait Alarm" accessed from http://www.cirago.com/iot-bait-1.php on Mar. 31, 2022.

\* cited by examiner

SYSTEMS AND METHODS FOR MONITORING FISHING LURES COUPLED TO A MARINE VESSEL

FIELD

The present disclosure generally relates to systems and methods for monitoring fishing lines and/or lures coupled to a marine vessel.

BACKGROUND

In game fishing, a captain and crew give considerable attention to fishing lures, the lengths of line connecting the fishing lures to the marine vessel, and the positions of the fishing lures relative to both the marine vessel and to pressure waves formed behind the marine vessel when moving through the water. The captain and crew may also track the length of line taken out by a fish and/or the time to land a fish.

Some fishing setups use line counters to measure the length of line let out between the marine vessel and the fishing lure. Line counters are available in the market in various forms. In one example, the line counter is a separate device that can be added to a typical rod and reel. The line counter has a wheel that is rotated by the fishing line as it passes across the rod. The wheel rotations are counted to determine the length of line let out of the reel. Rapala™ produces a "Digital Line Counter" of this type that is available in the market, model number RDLC. In other examples, the line counter is integrated into the reel, whereby the reel may be configured to reel the line in manually and/or electromechanically. Shimano™ produces a line counter of this type that is available in the market, which is known as the BeastMaster 9000, model number BM-9000. In each case the line counter includes a display for showing the length of the line counted, such as an analog or digital display built into the housing of the line.

The captain and crew therefore do their best to keep track of the measurements of these line counters in addition to tracking the fishing lures and the positions relative to the marine vessel and to the pressure waves formed behind the marine vessel, hoping to identify the most successful combinations thereof.

The following U.S. patents provide background information and are incorporated by reference in entirety: U.S. Pat. Nos. 11,000,021; 10,429,845; 10,372,976; 9,137,977; 7,441,189 and 5,581,930.

SUMMARY

This Summary is provided to introduce a selection of concepts that are further described below in the Detailed Description. This Summary is not intended to identify key or essential features of the claimed subject matter, nor is it intended to be used as an aid in limiting the scope of the claimed subject matter.

One embodiment of the present disclosure generally relates to a method for monitoring a fishing lure coupled to a marine vessel via a line. The method includes receiving a position with respect to the marine vessel in which the fishing lure is coupled to the marine vessel via the line. The method further includes receiving a line length of the line extending between the marine vessel and the fishing lure when the fishing lure is in use outside the marine vessel. The method further includes generating a graphic display on a display device, wherein the graphic display depicts the position of the line coupling the fishing lure to the marine vessel, and wherein the graphic display indicates the line length extending between the marine vessel and the fishing lure.

Another embodiment generally relates to a system for monitoring fishing lures coupled to a marine vessel via lines. The system includes a display device and a control system. The control system is configured to receive positions with respect to the marine vessel in which the fishing lures are coupled to the marine vessel via the lines. The control system is further configured to receive line lengths of each of the lines extending between the marine vessel and the fishing lures when the fishing lures are in use outside the marine vessel and to control the display device to generate a graphic display depicting the positions of the lines coupling the fishing lures to the marine vessel and indicating the line lengths.

Various other features, objects and advantages of the disclosure will be made apparent from the following description taken together with the drawings.

BRIEF DESCRIPTION OF THE DRAWINGS

The present disclosure is described with reference to the following Figures.

DETAILED DISCLOSURE

Figure 1:
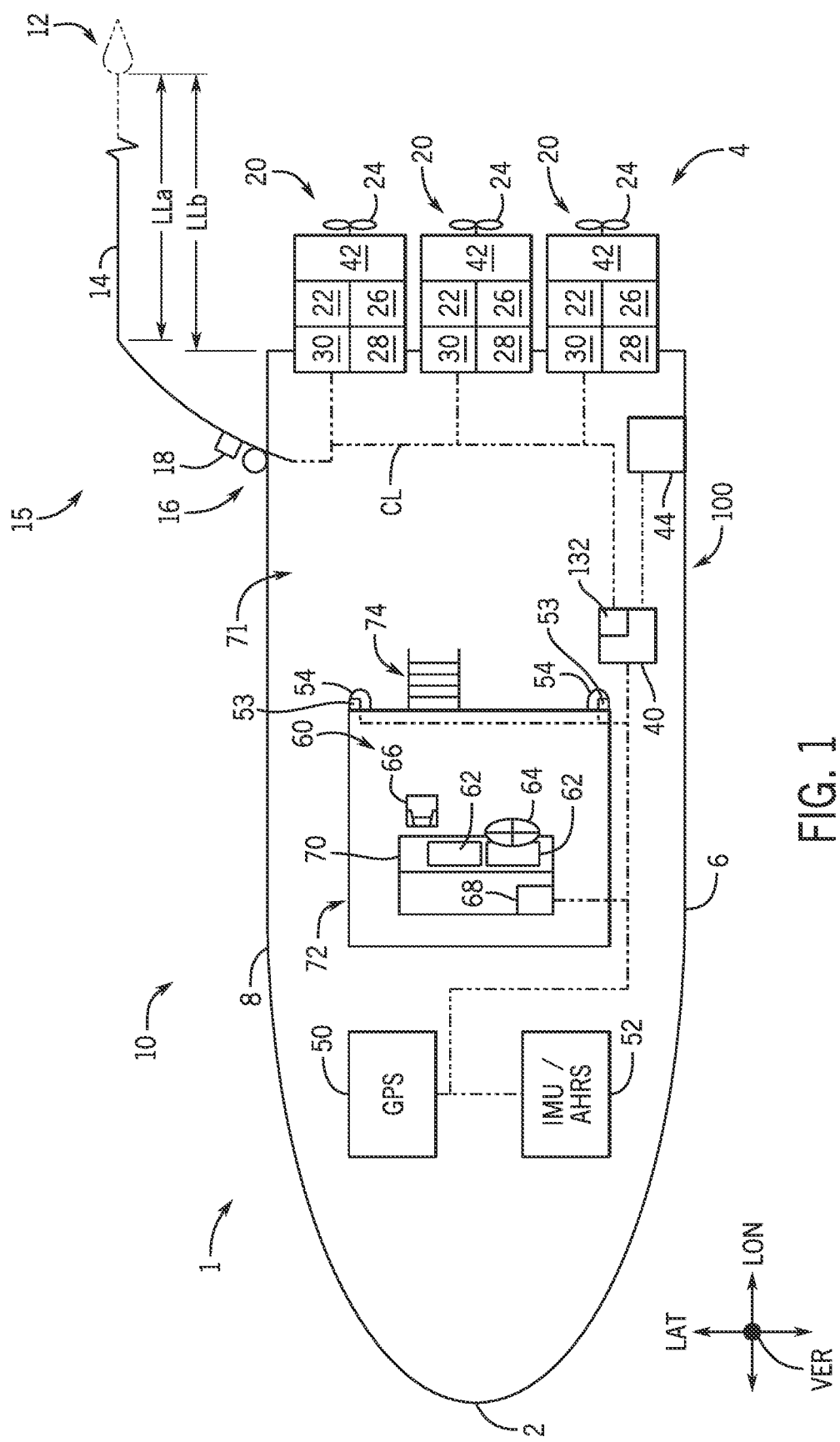
FIG. 1 is a top view of a marine vessel incorporating one embodiment of system for monitoring a fishing lure according to the present disclosure.

In the present description, certain terms have been used for brevity, clarity, and understanding. No unnecessary limitations are to be implied therefrom beyond the requirement of the prior art because such terms are used for descriptive purposes only and are intended to be broadly construed. The different systems and methods described herein may be used alone or in combination with other systems and methods. Various equivalents, alternatives, and modifications are possible.

A marine vessel operator must perform many tasks simultaneously while underway. In the case of a fishing charter, the operator must not only safely navigate the waters, such as trolling along a given depth contour, but must also assist clients as needs arise, set up and deploy fishing gear, and monitor that fishing gear (e.g., detecting when a fish is on, when lines are snagged, and/or other issues). The present inventor has recognized an unmet need for assisting the operator in monitoring fishing lines and lures and automatically alerting the operator when attention is needed.

Through experimentation and development, the present inventor has developed the systems and methods disclosed herein for monitoring fishing lures (and/or lines). The line lengths of each of the lines are received by a control system, which in turn generates a graphic display on a display device that is visible to the captain or and/or person managing the lines. The graphic display depicts the positions of the lines relative to the marine vessel and/or indicates the line lengths of the lines connecting the fishing lures to the marine vessel. The control system may be configured to automatically update the graphic display to indicate changes in these line lengths. In this manner, the captain and/or person managing the lines is constantly advised as to the state of the lines and can easily determine whether changes need to be made (such as changing the line lengths, changing the vessel speed, or tending to a fish on the line).

The methods and systems may be used for monitoring a single fishing lure, or multiple fishing lures. In general, the methods and systems provide for receiving positions in which the fishing lures are connected to the marine vessel, which may vary depending on the particular "spread" chosen by the operator, as discussed further below. Each of the fishing lures is connected to the marine vessel via a line, whereby the amount of the line extending between a given fishing lure and the marine vessel is referred to as its line length. In certain examples, the line lengths are measured by line counters, which in some cases are configured to transmit the measured line lengths wirelessly.

In certain examples, the system and method are also configured to monitor the positions of the lures with respect to target positions of the lures relative to the marine vessel, and/or target distances between the lures and one or more pressure waves, and provide alerts on the display when the lures are out of these positions. For example, target distances between the fishing lures and the marine vessel are compared to the line lengths. Indications may be provided if a target distance varies from the corresponding line length by more than a threshold amount, alerting the operator that the fishing lures are not positioned as intended relative to the marine vessel. In certain examples, target distances are determined or adjusted as a function of marine vessel speed.

The graphic display may also depict the locations of pressure waves formed behind the marine vessel. In certain examples, the locations of the pressure waves are determined as a function of marine vessel speed. The pressure waves may be updated on the graphic display when the marine vessel speed changes to reflect the impact on pressure wave locations. In certain examples, target distances are also provided for the distances between the fishing lures and the pressure waves. These target distances are compared to the actual distances between the fishing lures and the pressure wave (e.g., by knowing the line length between the marine vessel and a given fishing lure). Indications may be provided if the target distance varies from the actual distance by more than a threshold amount, alerting the operator that the fishing lures are not positioned as intended relative to the pressure waves.

Certain examples of methods disclosed herein further include monitoring steering rates of the marine vessel to avoid the tangling of lines, and/or monitoring changes in line lengths to detect when a fish is on the line. In each case, the graphic display may be updated to warn the operator when thresholds are exceeded.

FIG. 1 shows a system 10 for monitoring a fishing lure 12 coupled to a marine vessel 1 according to the present disclosure. The marine vessel 1 extends between a bow 2 and a stern 4 along a longitudinal axis LON, and between a port side 6 and starboard side 8 along a latitudinal axis LAT perpendicular to the longitudinal direction LON (each also being perpendicular to the vertical axis VER). The marine vessel 1 is propelled through the water by a plurality of marine propulsion devices 20, which while shown as outboard motors could instead be inboard motors, stern drives, pod drives, and/or jet drives. Each marine propulsion device 20 includes a powerhead 22. The powerheads 22 may be internal combustion engines (e.g., gasoline or diesel engines), electric motors, and/or a hybrid thereof. Each marine propulsion device 20 in FIG. 1 also includes a propeller 24 coupled in torque-transmitting relationship with a respective powerhead 22 so as to generate propulsion in the water.

The marine propulsion devices 20 further include powerhead speed sensors 26 measuring a speed of a respective powerhead 22 (or an output shaft thereof). In one example, the powerhead speed sensors 26 may be shaft rotational speed sensors (e.g., Hall-Effect sensors), which measure a speed of the powerhead 22 in rotations per minute (RPM) in a manner known in the art.

Each marine propulsion device 20 is further provided with steering actuators 28 configured to steer the marine propulsion devices 20, respectively, in accordance with commands from a steering device as discussed further below. The steering actuators 28 may operate as a "steer by wire" system rather than including physical linkages between the marine propulsion devices 20 and steering input devices (e.g., a steering wheel). The steering actuators 28 include steering angle sensors therein, which provide feedback regarding the steering angle of the corresponding marine propulsion device 20 in a manner known in the art. The steering actuators 28 may be hydraulically, pneumatically, and/or electromechanically operated. Additional information regarding exemplary steering actuators is provided in U.S. Pat. Nos. 7,150,664; 7,255,616; and 7,467,595, which are incorporated by reference herein.

Similarly, each marine propulsion device 20 is provided with a trim actuator 30 configured to adjust the trim angle of these devices in a manner known in the art. The trim actuators 30 include steering angle sensors therein, which provide feedback regarding the trim angle of the corresponding marine propulsion device 20 in a manner known in the art. The trim actuators 30 may be hydraulically, pneumatically, and/or electromechanically operated. Additional information regarding exemplary trim actuators is provided in U.S. Pat. Nos. 6,583,728; 7,156,709; 7,416,456; and 9,359,057, which are incorporated by reference herein.

With continued reference to FIG. 1, a central control module 40 (or CCM) is provided in signal communication with the powerheads 22, as well as being in signal communication with the associated sensors and other components noted herein below. In certain examples, the central control module 40 communicates with propulsion control modules 42 (or PCMs) and/or other control devices associated with each of the marine propulsion devices 20 in a manner known in the art. Although FIG. 1 shows one central control module 40, it will be recognized that more than one central control module may work together serially and/or in parallel, such as one central control module for each of the marine propulsion devices 20.

Power is provided to the marine vessel 1 via a power system 44, which may include batteries and/or other energy storage systems known in the art. The power system 44 provides power to the central control module 40 and propulsion control modules 42, as well as to other components associated with the marine propulsion devices 20 or marine vessel 1 more generally. One such additional component powered by the power system 44 is a global positioning system (GPS) 50 that provides location and speed of the marine vessel 1 to the central control module 40. Additionally, or alternatively, a vessel speed sensor such as a Pitot tube or a paddle wheel could be provided to detect the speed of the marine vessel 1. The marine vessel 1 may also include an inertial measurement unit (IMU) or an attitude and heading reference system (AHRS) (collectively shown as the IMU/AHRS 52). An IMU has a solid state, rate gyro electronic compass that indicates the vessel heading and solid-state accelerometers and angular rate sensors that sense the vessel's attitude and rate of turn. An AHRS provides 3D orientation of the marine vessel 1 by integrating gyroscopic measurements, accelerometer data, and magnetometer data. The IMU/AHRS 52 could be GPS-enabled, taking the place of a separate GPS 50.

The marine vessel 1 of FIG. 1 includes a helm 60 with a dashboard 70 having a number of operator input devices for controlling various functions of the system 10 and the marine vessel 1 more generally. The helm 60 of this marine vessel 1 is raised, specifically being positioned on a tower 72 above a cabin so as to improve visibility and increase space for the deck 71 and the cabin under the tower 72. A ladder 74 is provided for moving between the helm 60 and the deck 71. While the raised helm 60 has advantages as discussed above, it also renders the task of giving attention to the fishing gear on the deck 71 below more challenging.

With continued reference to FIG. 1, the operator input devices at the helm 60 include a multi-functional display device 62 including a user interface, which may be an interactive, touch-capable display screen, a keypad, a display screen and keypad combination, a track ball and display screen combination, and/or any other type of user interface known in the art. To provide one example, the display device 62 may be part of a VesselView® onboard management system by Mercury Marine Corporation of Fond du Lac, Wisconsin. The operator input devices further include one or more steering devices, such as a steering wheel 64 and/or a joystick, configured to facilitate user input (e.g., via the central control module 40, the propulsion control modules 42, and/or a helm controller 68 in a manner known in the art) for steering the marine vessel 1.

A throttle lever 66 is also provided as an operator input device for providing thrust commands, including both a magnitude and a direction of thrust, to the central control module 40. By way of example, rotating the throttle lever 66 in a forward direction away from its neutral, detent position could be interpreted as a value from 0% to 100% operator demand corresponding via an input/output map, such as a look up table, to a position of the throttle valves of the powerheads 22. For example, the input/output map might dictate that the throttle valves are fully closed when the throttle lever 66 is in the forward, detent position (i.e., 0% demand), and are fully open when the throttle lever 66 is pushed forward to its furthest extent (i.e., 100% demand). As discussed further below, similar methods may also be employed for controlling steering, whereby operator inputs are received from a range of −100% to +100% corresponding to full port and full starboard steering directions, which then cause corresponding steering of the marine propulsion devices 20, in certain examples through the use of a lookup table.

Figure 2:
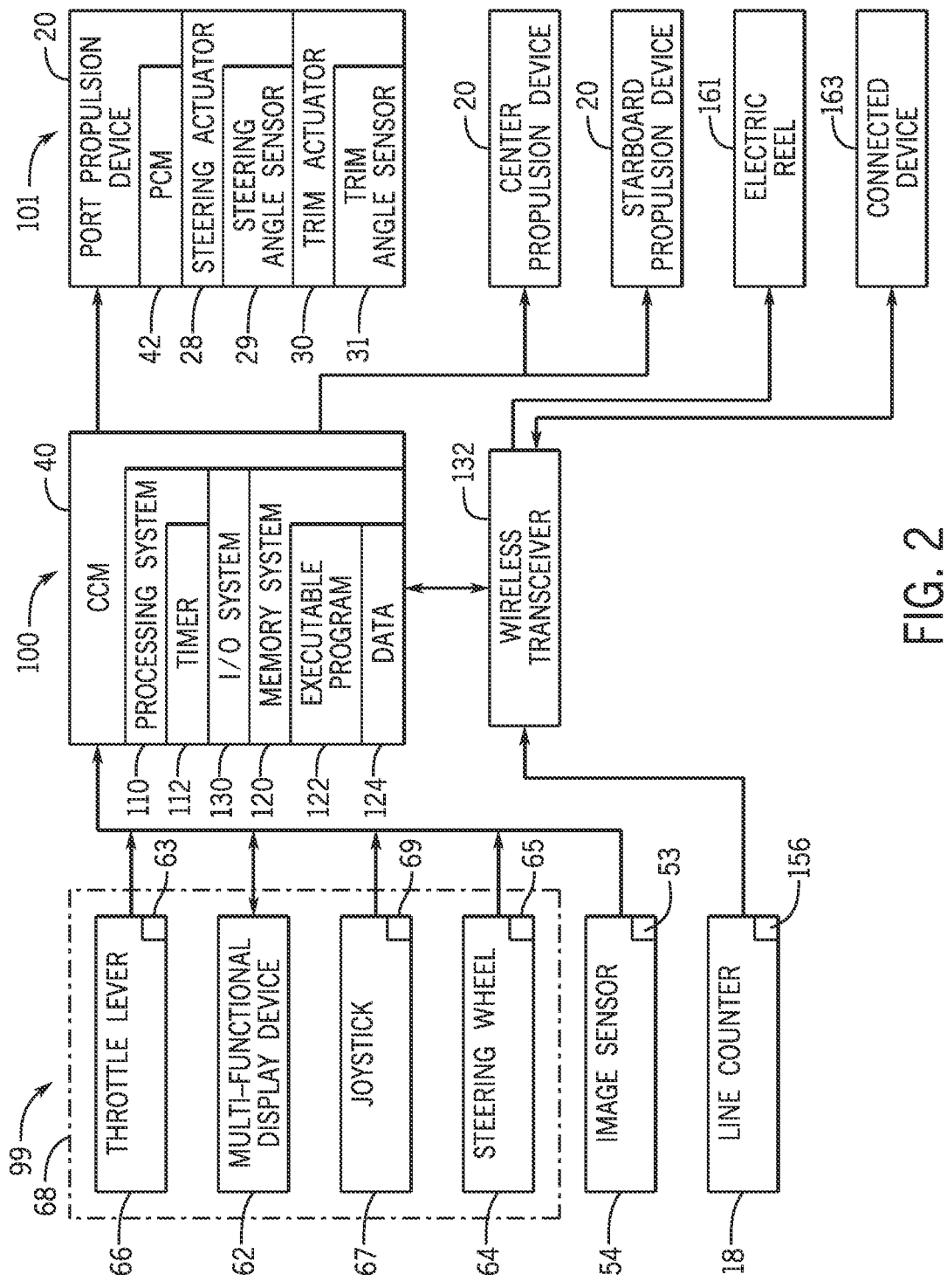
FIG. 2 is schematic view of a control system such as may be incorporated within the marine vessel of FIG. 1.

Additional information is now provided for subsystems within an exemplary control system 100, which includes one or more central control modules 40, one or more propulsion control modules 42, the helm controller 68, an image processor 53 (discussed below), and/or other controllers, as shown in FIG. 2. A person of ordinary skill in the art will recognize that these subsystems may also be present within additional central control modules 40 (as applicable) and/or propulsion control modules 42 or other controllers within the marine vessel 1. In the example shown, each central control module 40 includes a processing system 110, which may be implemented as a single microprocessor or other circuitry or be distributed across multiple processing devices or sub-systems that cooperate to execute the executable program 122 from the memory system 120. Non-limiting examples of the processing system include general purpose central processing units, application specific processors, and logic devices.

Each central control module 40 further includes a memory system 120, which may comprise any storage media readable by the processing system 110 and capable of storing the executable program 122 and/or data 124. The memory system 120 may be implemented as a single storage device or be distributed across multiple storage devices or sub-systems that cooperate to store computer readable instructions, data structures, program modules, or other data. The memory system 120 may include volatile and/or non-volatile systems and may include removable and/or non-removable media implemented in any method or technology for storage of information. The storage media may include non-transitory and/or transitory storage media, including random access memory, read only memory, magnetic discs, optical discs, flash memory, virtual memory, and non-virtual memory, magnetic storage devices, or any other medium which can be used to store information and be accessed by an instruction execution system, for example. An input/output (I/O) system 130 provides communication between the control system 100 and peripheral devices, such as input devices 99 and output devices 101, which are discussed further below. The IO system 130 includes a wireless transceiver 132 configured to communicate wirelessly via input devices 99 and/or output devices 101, or with other elements of the control system 100, via wireless protocols known in the art. In practice, the processing system 110 loads and executes an executable program 122 from the memory system 120, accesses data 124 stored within the memory system 120, and directs the system 10 to operate as described in further detail below.

A person of ordinary skill in the art will recognize that these subsystems within the control system 100 may be implemented in hardware and/or software that carries out a programmed set of instructions. As used herein, the term "central control module" may refer to, be part of, or include an application specific integrated circuit (ASIC); an electronic circuit; a combinational logic circuit; a field programmable gate array (FPGA); a processor (shared, dedicated, or group) that executes code; other suitable components that provide the described functionality; or a combination of some or all of the above, such as in a system-on-chip (SoC). A central control module may include memory (shared, dedicated, or group) that stores code executed by the processing system. The term "code" may include software, firmware, and/or microcode, and may refer to programs, routines, functions, classes, and/or objects. The term "shared" means that some or all code from multiple central control modules may be executed using a single (shared) processor. In addition, some or all code from multiple central control modules may be stored by a single (shared) memory. The term "group" means that some or all code from a single central control module may be executed using a group of processors. In addition, some or all code from a single central control module may be stored using a group of memories. One or more central control module 40 may together constitute a control system 100 and may be located anywhere on the marine vessel 1.

A person of ordinary skill in the art will understand in light of the disclosure that the control system 100 may include a differing set of one or more control modules, or control devices, which may include engine control modules (ECMs) or propulsion control modules 42 for each marine propulsion device 20 (which, when applicable, may be referred to as ECMs even if the marine propulsion device 20 contains an electric motor in addition to or in place of an internal combustion engine), one or more thrust vector control modules (TVMs), one or more helm control modules (HCMs), and/or the like. Likewise, certain aspects of the present disclosure are described or depicted as functional and/or logical block components or processing steps, which may be performed by any number of hardware, software, and/or firmware components configured to perform the specified functions. For example, certain embodiments employ integrated circuit components, such as memory elements, digital signal processing elements, logic elements, look-up tables, or the like, configured to carry out a variety of functions under the control of one or more processors or other control devices.

The control system 100 communicates with each of the one or more components of the marine vessel 1 via a communication link CL, which can be any wired or wireless link. The illustrated communication link CL connections between functional and logical block components are merely exemplary, which may be direct or indirect, and may follow alternate pathways. The control system 100 is capable of receiving information and/or controlling one or more operational characteristics of the marine vessel 1 and its various sub-systems by sending and receiving control signals via the communication links CL. In one example, the communication link CL is a controller area network (CAN) bus; however, other types of links could be used. It will be recognized that the extent of connections and the communication links CL may in fact be one or more shared connections, or links, among some or all of the components in the marine vessel 1. Moreover, the communication link CL lines are meant only to demonstrate that the various control elements are capable of communicating with one another, and do not represent actual wiring connections between the various elements, nor do they represent the only paths of communication between the elements. Additionally, the marine vessel 1 may incorporate various types of communication devices and systems, and thus the illustrated communication links CL may in fact represent various different types of wireless and/or wired data communication systems.

As will be discussed further below, the control system 100 communicates with input devices 99 from various components such as steering devices, for example via sensors 63, 65, and 69 that detect the positions of the throttle lever 66, the steering wheel 64, and/or a joystick 67, respectively. The control system 100 also communicates with other input devices 99, such as the multi-functional display device 62, the GPS 50, the IMU/AHRS 52, line counters 18, and/or image sensors 54, as discussed further below.

The control system 100 also communicates with output devices 101 such as propulsion control modules 42, steering actuators 28, trim actuators 30, and/or connected devices 163 such as smart phones or watches, for example. It will be recognized that the arrows shown are merely exemplary and that communication may flow in multiple directions. For example, the multi-functional display device 62 and/or a connected device 163 may serve as both an input device 99 for the operator to provide commands, and an output device 101 to display information transmitted from the central control module 40 (e.g., via the wireless transceiver 132). For example, the connected device 163 may be a personal computing system or smart phone running an application, such as the VesselView Mobile@application, that allows it to interface with the central control module 40, the line counter 18, and or other devices and systems on the marine vessel.

Returning to FIG. 1, the line 14 couples the fishing lure 12 to the marine vessel 1 via additional fishing gear 15, which here includes a rod and reel 16 having a line counter 18. The line counter 18 is configured to measure a length of the line 14 that is let out from the rod and reel 16, which is also referred to as the "line length." It should be recognized that the line length may be calibrated relative to different datums, such as a first line length LLa measured between the fishing lure 12 and the end of the rod and reel 16, or a second line length LLb measured between the fishing lure 12 and the marine vessel 1.

Figure 3:
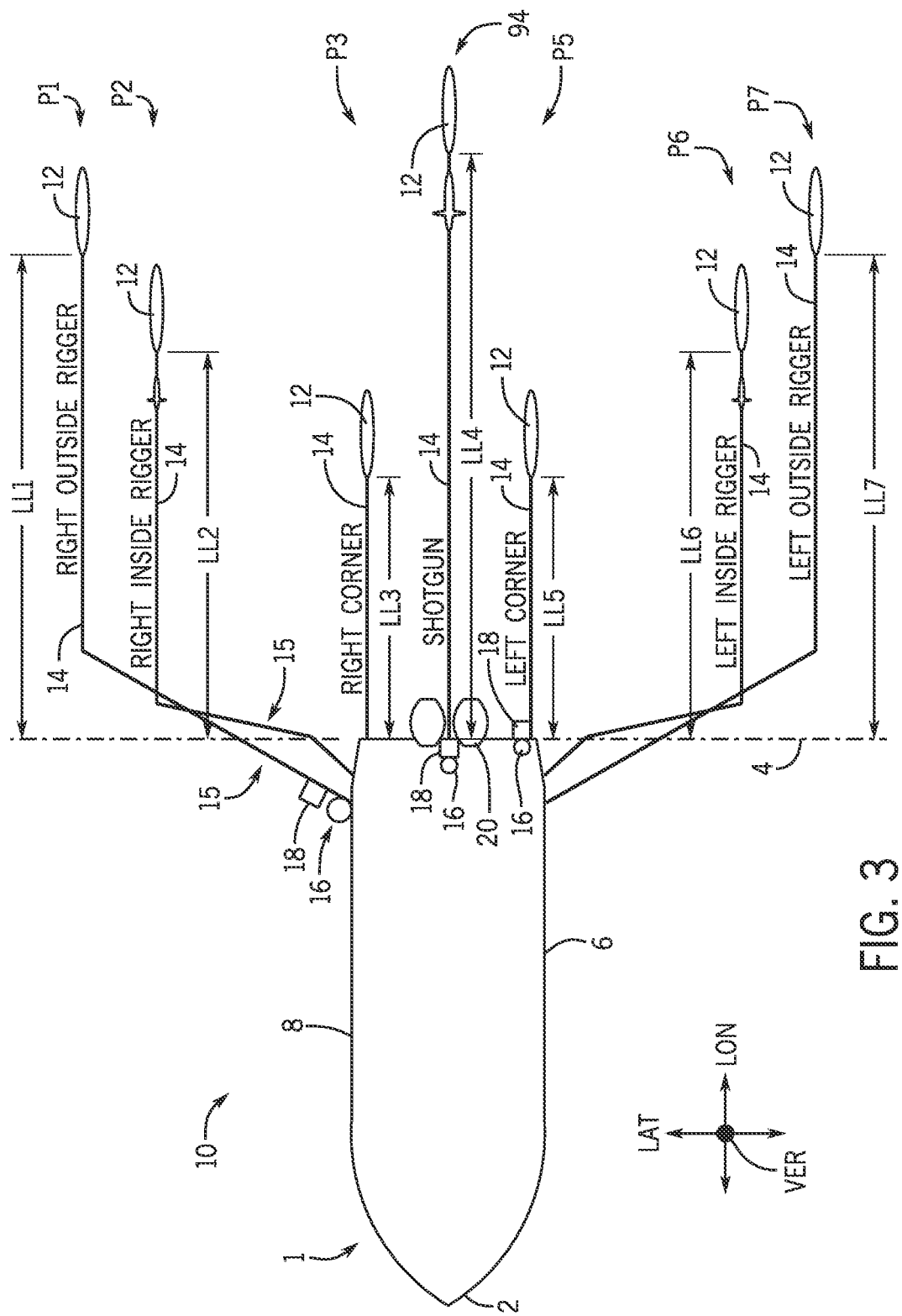
FIG. 3 is a top view depiction of a marine vessel similar to that of FIG. 1, showing a spread of multiple fishing lures in different positions relative to the marine vessel.

FIG. 3 shows a configuration or "spread" in which there are seven fishing lures 12 coupled to the marine vessel 1, each via its own line 14 and fishing gear 15. Each set of fishing gear 15 and fishing lure 12 occupies a different position relative to the marine vessel, designated for this spread as positions P1-P7. To prevent tangling of the lines, the fishing gear 15 may include riggers in a manner known in the art (e.g., see positions P1, P2, P6, and P7). It should be recognized that greater or fewer positions may be used. Similarly, the line lengths LL1-LL7 of the lines 14 extending between the fishing lures 12 and the marine vessel 1 need not be the same, which here are shown relative to the stern 4 of the marine vessel 1. Likewise, different fishing gear 15, materials comprising the lines 14, and/or fishing lures 12 may be used the positions P1-P7. By way of example, the fishing lures 12 may include a bucktail jigs, crank baits, flutter jigs, hammered spoons, lipped plugs, poppers, sinking twitch baits, spoons, and others known in the art. The fishing lures 12 may also be smart lures, for example those disclosed in U.S. Pat. No. 11,000,021. In certain embodiments, the arrangement of positions and the intended line lengths associated therewith (also referred to as target distances) are stored within the memory system 120 (FIG. 2), as discussed further below.

Figure 4:
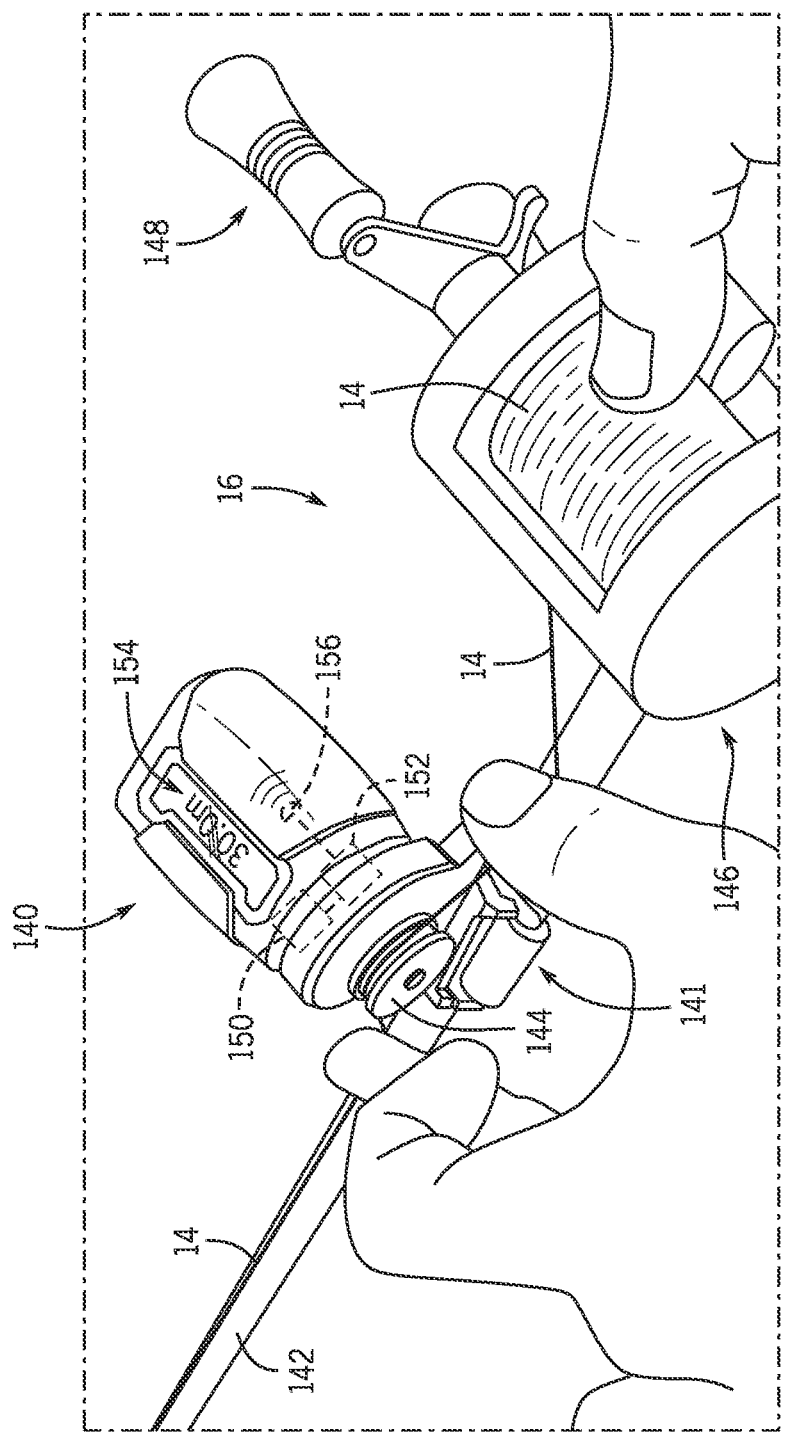
FIG. 4 is a perspective view of one example of line counter usable with a system like that of FIG. 1.

Additional information is now provided for two examples of line counters 18 for use with the system 10 according to the present disclosure. FIG. 4 shows a line counter 140 configured to be attached to a conventional rod and reel 16. In particular, the line counter 18 includes a clamp 141 for fixing the line counter 18 to the rod 142 of the rod and reel 16 in a conventional manner. The line counter 18 further includes a wheel 144 with a groove configured to receive the line 14 of the rod and reel 16 therein. The wheel 144 is rotated in a first direction when the line 14 is let out of the reel 146 of the rod and reel 16, and rotated in a second direction opposite the first direction when the line 14 is reeled back into the reel 146 (here via a manual crank 148 in a manner known in the art). The rotations of the wheel 144 are measured by an encoder 150 within the line counter 140, which are converted via a control system 152 to a line length and displayed on the display device 154. The control system 152 may be similar to the control system 100 discussed above with respect to FIG. 2. As discussed above, the line counter 140 can be calibrated such that the line length is displayed on the display device 154 as 0.0 meters when the lure is even with the stern of the marine vessel.

For line counters known in the art where line length measurements are only available via the built-in display device, the operator must be physically present at the line counter to determine the real-time line length for a given line. The present inventor has recognized that the problem of manually monitoring multiple lines is further exacerbated when paired with other activities, such as navigating the marine vessel or tending to other lines, whereby it is difficult to keep up with the line lengths in real time. The manual process of gathering line length measurements also makes tracking more difficult for the operator, which may be done on paper along with tracking other information such as the time of day or weather conditions. Further, failure to detect changes in line length delays the operator's responsiveness to a catch or to other causes of change in line length.

In contrast to line counters presently known in the art, the system 10 is configured such that the line length measurements are not limited to being displayed on the display device 154 of the line counter but are also communicated externally and utilized by the control system along with position and/or propulsion information to generate a graphic display to assist the operator. In particular, the line counter 140 of FIG. 4 communicates the line length measurements from the control system 152 to the central control module 40 to then be displayed conveniently on the multi-functional display device 62 at the helm (FIG. 1). In the embodiment shown, the line counter 140 communicates via a wireless transceiver 156, which wirelessly transmits the line length measured to the central control module 40 via a wireless transceiver 132 connected thereto (FIG. 1). The wireless transceivers 156, 132 may communicate with each other via Wi-Fi, Bluetooth®, and/or other wireless hardware and protocols generally known in the art. It should be recognized that the line counter 140 may alternatively communicate with the central control module 40 via wired connections.

Figure 5:
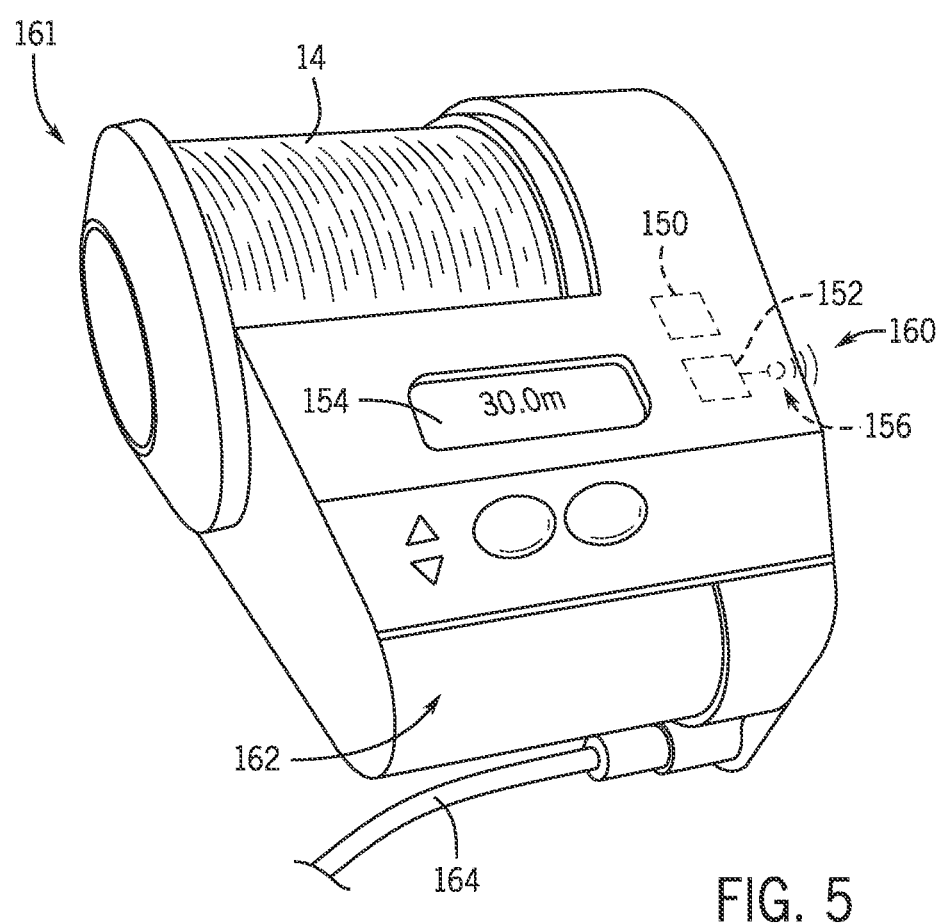
FIG. 5 is a perspective view of another example of line counter usable with a system like that of FIG. 1.

FIG. 5 depicts another type of line counter 160, this one being integrated directly into the reel 161. The line counter 160 includes many of the same components as the line counter 140 of FIG. 4, which are labeled using the same reference numbers for simplicity. The line counter 160 of FIG. 5 further includes an electric motor 162 for creating "jigging" motions, or for reeling in and/or letting out the line 14 from the reel 161. The electric motor 162 is connected via a cable 164 so as to be controllable at the helm 60 (FIG. 1). As with the line counter 140 of FIG. 4, the line counter 160 of FIG. 5 wirelessly communicates the measured line length to the central control module 40 (FIG. 1).

Figure 6:
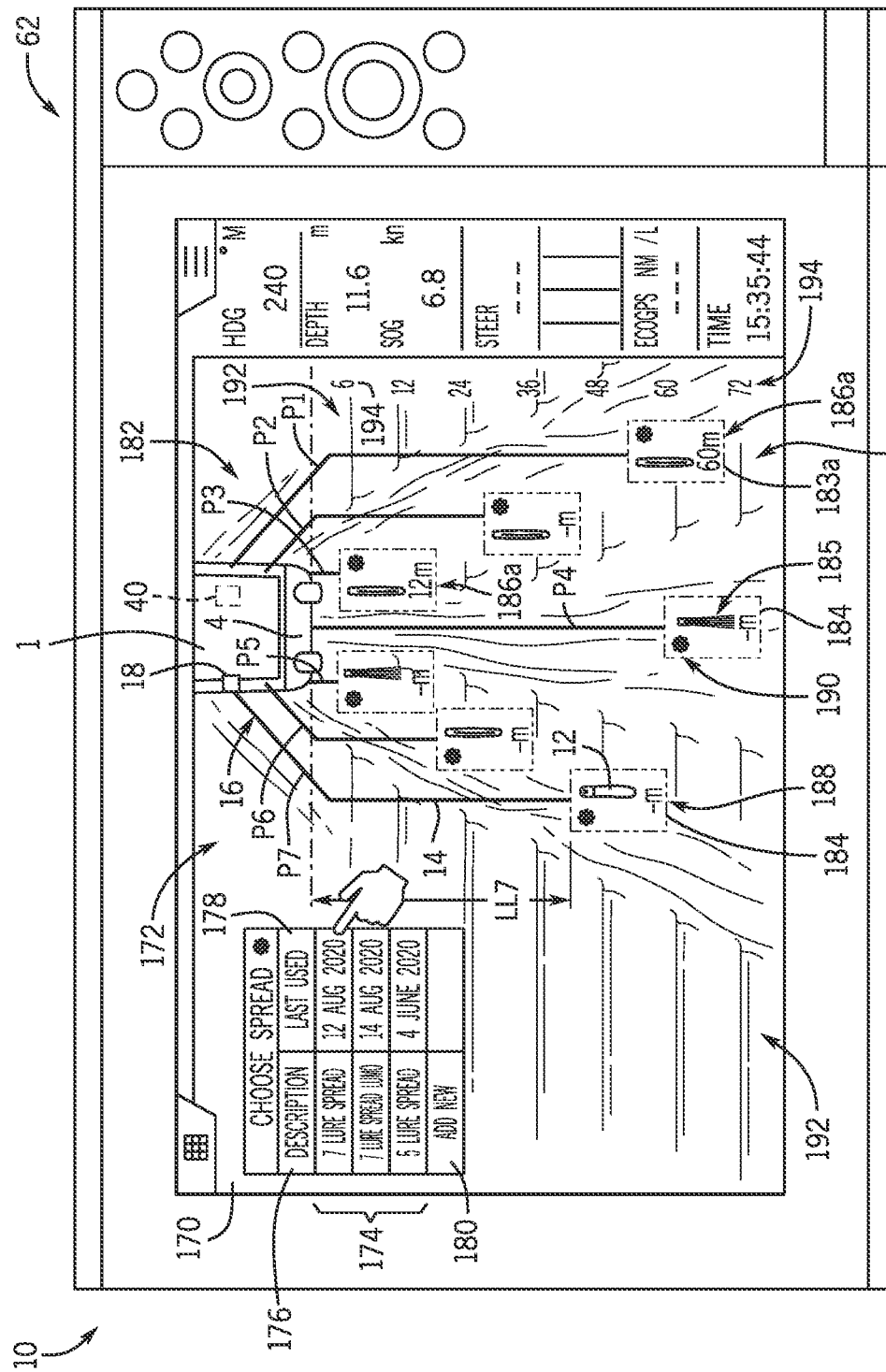
FIG. 6 depicts a first screen of a graphic display generated according to the present disclosure.

FIG. 6 shows a graphical user interface (GUI) 170 within the system 10 for monitoring fishing lures 12 according to the present disclosure. The GUI 170 may be displayed via the multi-functional display device 62 at the helm or may be provided via a separate display device. The GUI 170 of FIG. 6 particularly shows a setup screen 172 through which the operator may select the spread 174 of the fishing lures 12 being coupled to the marine vessel, which includes the quantity of fishing lures 12 and the positions thereof relative to the marine vessel (here positions P1-P7), as well as target distances for the lines 14 between the fishing lures 12 and the stern 4 of the marine vessel 1. The individual spreads 174 available for selection may include a description 176 and a date 178 in which that spread 174 was last chosen. New spreads may also be created and saved via an add button 180.

Selecting a spread 174 updates the graphic display 182 produced on the multi-functional display device 62 to reflect the corresponding positions P1-P7 of the fishing lures 12 with respect to the marine vessel 1 and the target distances for the line lengths (e.g., LL7) of the lines 14 connected to the fishing lures 12. In certain embodiments, the target distances for the line lengths are not displayed numerically on the GUI 170, but instead are reflected by the positioning of the fishing lures 12 relative to the marine vessel 1 being displayed. In other words, fishing lures 12 having greater target distances for a chosen spread 174 are shown farther astern from the marine vessel 1 than those with lesser target distances. The port-starboard positioning between fishing lures 12 is also displayed corresponding to the chosen spread 174, which is a function of rigging and positioning of the fishing gear within the marine vessel 1.

Information boxes 184 are also included within the graphic display 182 of the GUI 170. Each information box 184 includes information corresponding to a fishing lure 12 in use at that position, such as an icon 185 depicting the type of fishing lure 12. The fishing lures 12 may vary in size, shape, color, iridescence, hook number, hook size, hook configuration, or factors having differences in appearance or function in the water.

The information box 184 has an outline (see e.g., outline 183a) that changes within the graphical display 182 of the GUI 170 to depict different information, such as by varying the color, style, or line weight. For the information boxes 184 of FIG. 6, the outlines 183a are shown in a first manner (e.g., light dashed lines or a first color) to indicate that the line counters 18 are not yet connected and/or providing information to the central control module 40 to communicate the line lengths therefrom.

With continued reference to FIG. 6, each information box 184 also includes a numeric value 186a and units 188 (here, meters) relating to the line length of the line 14 extending between the marine vessel 1 and the fishing lure 12. In the setup screen 172, the numeric value 186a may be shown as the target distance for the line length. In other screens, which are discussed further below, the numeric value may be shown as the actual distance measured as the line length between the marine vessel 1 or the rod end and the fishing lure 12 (numeric value 186b), a difference between the target distance and the actual distance, and/or a rotation of two of more of the target distance, actual distance, and difference (which may vary in color, font, or style to distinguish between them).

A setup icon 190 is provided for selecting the particular fishing lure 12 to use at a given position relative to the marine vessel 1, as well as the units 188 and what to display as the number value. Each selection may be provided via a drop-down list, swiping to cycle through options saved in memory, or manual entry. In certain embodiments, a new fishing lure 12 can be added for selection and stored in the memory system 120 discussed above (FIG. 2) via an image captured by the image sensor 54 (FIG. 1), which is discussed further below.

The GUI 170 of FIG. 6 further depicts pressure waves 192 positioned behind the marine vessel 1, along with the corresponding distances 194 from the stern 4. In various embodiments, the pressure waves 192 and corresponding distances 194 may be displayed at a constant and predetermined location or may be determined as a function of a current velocity of the marine vessel 1. The distances 194 to the pressure waves 192 may be determined empirically based on input from vision systems on the marine vessel and/or by positioning the fishing lure 12 on a pressure wave 192 and noting the line length measured by its corresponding line counter 18. The distances 194 may also be determined using equations or models corresponding to the particular marine vessel 1 and its current velocity (e.g., using established equations governing fluid dynamics, including those for characterizing the Kelvin wake pattern created by objects moving in water). For example, the pressure waves 192 and distances 194 may be shown for a trolling speed of 9 knots, which may be adjustable via selections in the setup screen 172. The pressure waves 192 are graphically displayed and may be located on the graphic display relative to the marine vessel 1 and to the fishing lures 12 based on these distances 194, whereby greater distances are shown to be farther astern from the marine vessel 1 than lesser distances.

In certain embodiments, the pressure waves 192 and distances 194 are determined as a function of the actual velocity of the marine vessel 1. The velocity of the marine vessel 1 may be measured via conventional methods such as those described above, which are communicated to the central control module 40. The distances 194 may then be determined based on the velocity using algorithms or by referencing a lookup table stored in the memory system 120. As stated above, the distances 194 of the pressure waves 192 may be provided specifically for a given marine vessel 1 (e.g., based on its hull design, etc.).

The setup screen 172 may further be configured to allow the operator to enter a velocity and/or one or more distances 194 of the correspondingly created pressure waves 192 when underway. This allows for calibration and may also improve the accuracy of the system 10 when there changes in marine vessel weight and/or the like that impact pressure wave 192 distances 194. In certain embodiments, the image sensors 54 discussed below (see FIG. 1) may be configured to automatically detect the distances 194 to the pressure waves 192 for graphically displaying on the GUI 170. Additional information regarding the image sensors 54 is provided below.

Figure 7:
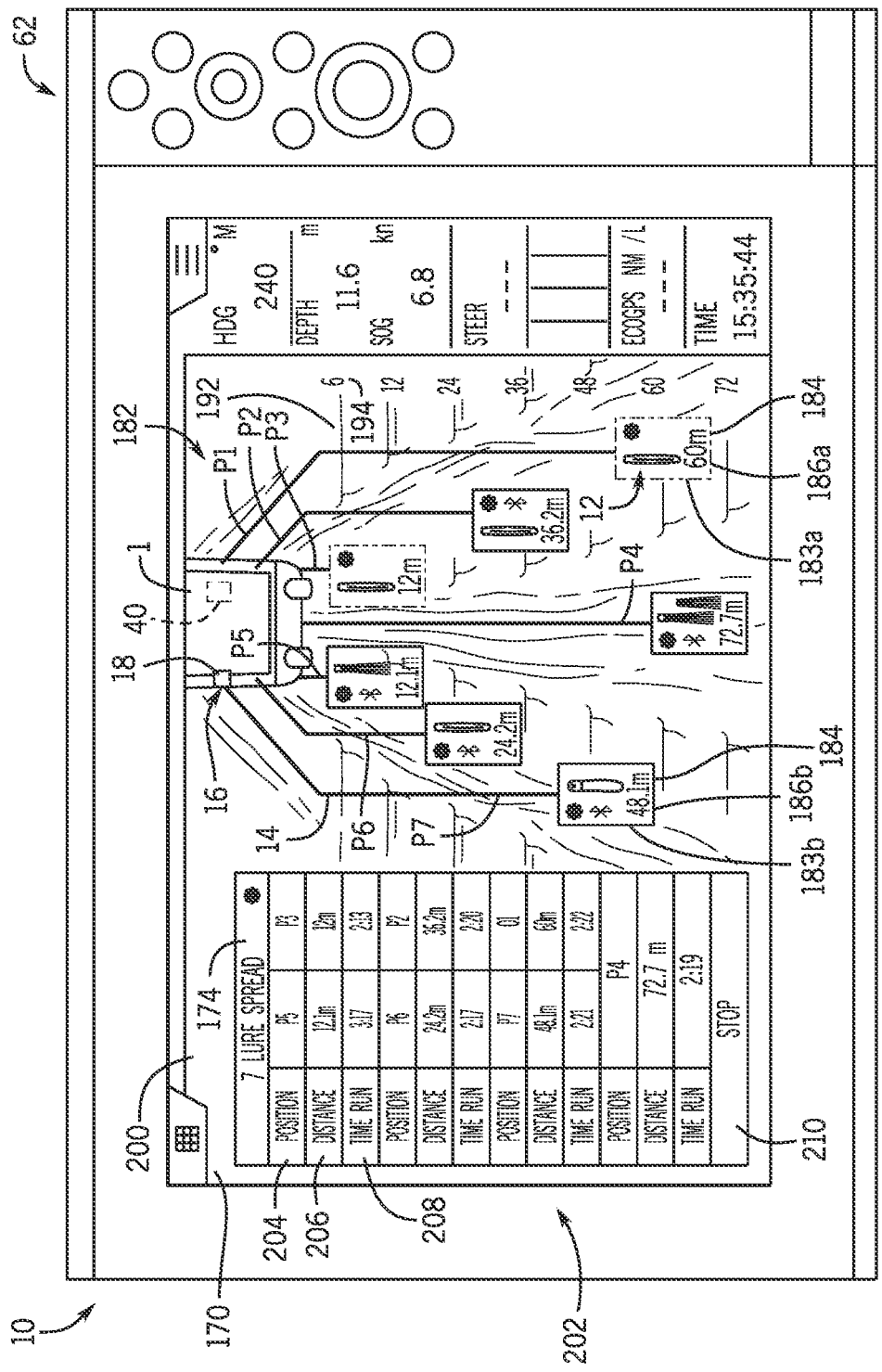
FIG. 7 depicts a second screen of a graphic display generated according to the present disclosure.

The presently disclosed system 10 provides for connectivity between the line counter 18 of each rod and reel 16 and the central control module 40 such that the graphic display 182 generated by the GUI 170 is updated and provides indications based on the line length measurements of these line counters 18. FIG. 7 depicts a running screen 200 displayed on the GUI 170, here showing the same spread 174 shown in FIG. 6. The line counters 18 associated with positions P2 and P4-P7 are now wirelessly connected to the central control module 40, which is indicated in the graphic display 182 by the solid-lined outlines 183*b* of the information boxes 184 associated with these positions (a second exemplary manner of showing outlines). The outlines 183*a* of the information boxes 184 for positions P1 and P3 remain as light-dashed lines to indicate that these line counters 18 are not communicating with the central control module 40. By way of example, these line counters 18 may not be communicating because no fishing lure 12 is deployed in those positions, the line counters 18 have not yet been paired or turned on, or due to a communication failure.

In addition to differing in outline, the information boxes 184 associated with connected line counters 18 in FIG. 7 also show different information as the numeric value. Specifically, the running screen 200 has been configured such that the line lengths measured by any connected line counters 18 (here, those in positions P2 and P4-P7) are shown as the numeric values 186*b*. In contrast, the numeric values 186*a* associated with non-connected line counters 18 continue to show the target distances associated with the selected spread 174.

The graphical display 182 may keep the locations of the fishing lures 12 static relative to the marine vessel 1, remaining in the locations associated with the selected spread 174. In this case, the actual location of the fishing lures 12, and particularly the line lengths associated therewith, are indicated via the numeric values 186*b* as described above. For example, the fishing lures 12 associated with positions P2 and P6 shows numeric values 186*b* corresponding to line lengths of 36.2 m and 24.2 m, respectively.

In other embodiments, the graphic display may dynamically update the locations of the fishing lures 12 relative to the marine vessel 1 to reflect changes to the line lengths over time. In this case, depicting the actual locations of the fishing lures 12, while also depicting the pressure waves 192 and corresponding distances 194, allows the operator to quickly see the positions of the fishing lures 12 relative to the pressure waves 192. For example, if the locations of the fishing lures 12 in FIG. 7 are shown dynamically, the operator can see that the fishing lure 12 of position P2 is directly on or slightly closer to the marine vessel 1 than the pressure wave 192 having a distance 194 of 36 m. Likewise, the fishing lure 12 of position P6 is slightly aft of the pressure wave 192 having a distance 194 of 24 m. This allows the operator to quickly visualize the relative positions of the fishing lures 12 not only relative the marine vessel 1, but also relative to the pressure waves 192. In certain use cases, it is advantageous to position the fishing lures 12 at the front face of the pressure wave 192 (also referred to as being within the "window"). The farther the fishing lure 12 is positioned down the face of the pressure wave 192, the larger the window, meaning the more visible the fishing lure 12 is from behind for the fish to track it.

The running screen 200 of FIG. 7 further depicts a runtime table 202 for the spread 174 in use. The runtime table 202 provides a consolidated view of the line lengths 206 associated with the line counter 18 at each position 204, as well as the time 208 that each fishing lure 12 has been in use. The time 208 may be determined as an elapsed time since a given line counter 18 was paired with the central control module 40, or an elapsed time since that given line counter 18 communicated a line length 206 exceeding a threshold value indicating that the fishing lure 12 is in use. For example, a fishing lure 12 may be determined to be in use when the corresponding line counter 18 communicates a line length 206 of at least 1.0 m. The times 208 may be stopped by clicking on a given position (or the information box 184 associated therewith) and manually selecting a stop button. The times 208 may also be simultaneously stopped by pressing a start/stop button 210 in the runtime table 202.

The system 10 is further configured to alert the operator when a fish is likely on the line (on one of the fishing lures 12), and to track various information during the process of landing the fish in the marine vessel 1. The fish may be detected by monitoring the line length 226. In certain embodiments, the system 10 determines that a fish is likely to be on the line when the line length 226 changes more than a predetermined threshold amount stored in the memory system 120. For example, the predetermined threshold may be a fixed value such as 5.0 m, a percentage of the measured line length and/or target distance for that fishing lure 12

(e.g., 10%), and/or a difference between the target distance and the measured line length exceeding a fixed or relative value such as 10.0 m or 5%.

In other embodiments, the system 10 determines that a fish is likely on the line by comparing a line rate of change of the line length changing over time to a threshold rate. Examples of threshold rates include 0.3 m/second, 0.1 m/second for at least 3 seconds, or 1.0 m within a rolling 1-minute time period. The threshold values, rates, and techniques for comparison (e.g., fixed, relative, or rate) may be adjustable by the operator and need not be the same for all positions P1-P7.

Figure 8:
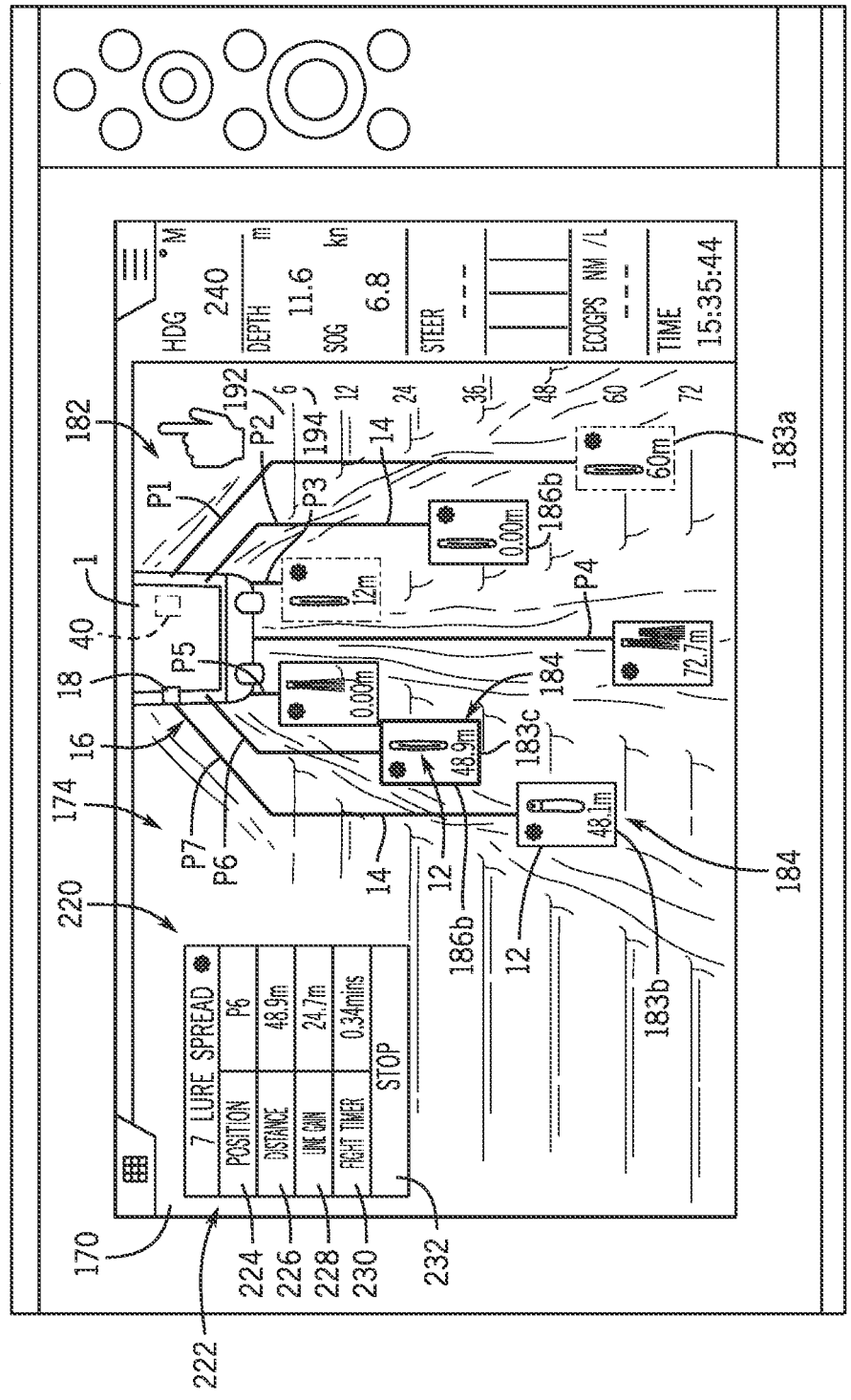
FIG. 8 depicts a third screen of a graphic display generated according to the present disclosure.

When the system 10 determines that a fish is likely on the line, such as via one of the techniques described above, it automatically changes from the running screen 200 shown in FIG. 7 to a fighting screen 220 as shown in FIG. 8. The fighting screen 220 on the GUI 170 again shows the same spread 174 of FIGS. 6 and 7 but changes the outline 183c of the information box 184 for the fishing lure 12 believed to have a fish on. FIG. 8 shows the outline 183c for the fishing lure 12 in position P6 having a thick solid line to distinguish from the other types of outlines discussed above (a third exemplary manner of showing outlines). However, it should be recognized that the types of outlines may vary in other manners, such as by flashing the outline of the information box 184 with the fish on using a different color. The system 10 may also or alternatively display written messages on the GUI 170, such as "ACTIVITY DETECTED!CHECK POSITION 6." A similar message and/or alarm sounds may also or alternatively be provided through speakers at the helm. Likewise, messages and/or audible alarms may be provided to the operator via other connected devices, for example wirelessly via the wireless transceiver 132 (FIG. 2) to a wirelessly connected device 163 such as a smart phone, tablet, or smart watch.

The fighting screen 220 of FIG. 8 further includes a fish-on table 222 that shows the particular position 224 (here, position P6) believed to have a fish on the line. The fish-on table 222 shows the current line length 226 as measured by the line counter 18, as well as a change 228 in the line length 226 from a previous, relatively stable line length before the fish was detected to be on the line. The previous line length may be a running average from a point in time before the change in line length determined to correspond to a fish being on the line.

The fish-on table 222 also includes a timer 230 that displays an elapsed time since a fish was determined to be on the line. In certain embodiments, the timer 230 does not start counting until the line counter 18 detects that the line 14 is being reeled back in, therefore counting the fight time versus the fish-on time. A start/stop button 232 is again provided for manually starting and stopping the timer 230. In certain embodiments, stopping the timer 230 via the start/stop button 232 returns the GUI 170 to the running screen 200, or returns if not started again within an elapsed timeout period (e.g., 10 seconds).

It can also be seen in FIG. 8 that some of the other lines 14 have been reeled in to avoid tangling while landing the fish. In particular, the fishing lures 12 of positions P2 and P5 have been reeled entirely in, showing numeric values 186b of their corresponding line length measurements of 0.00 m. The number of decimal points may also indicate the type of numeric value being shown, such as including a hundredths value when entirely reeled in and/or no decimal point when the line counter 18 is not communicating line length information.

Figure 9:
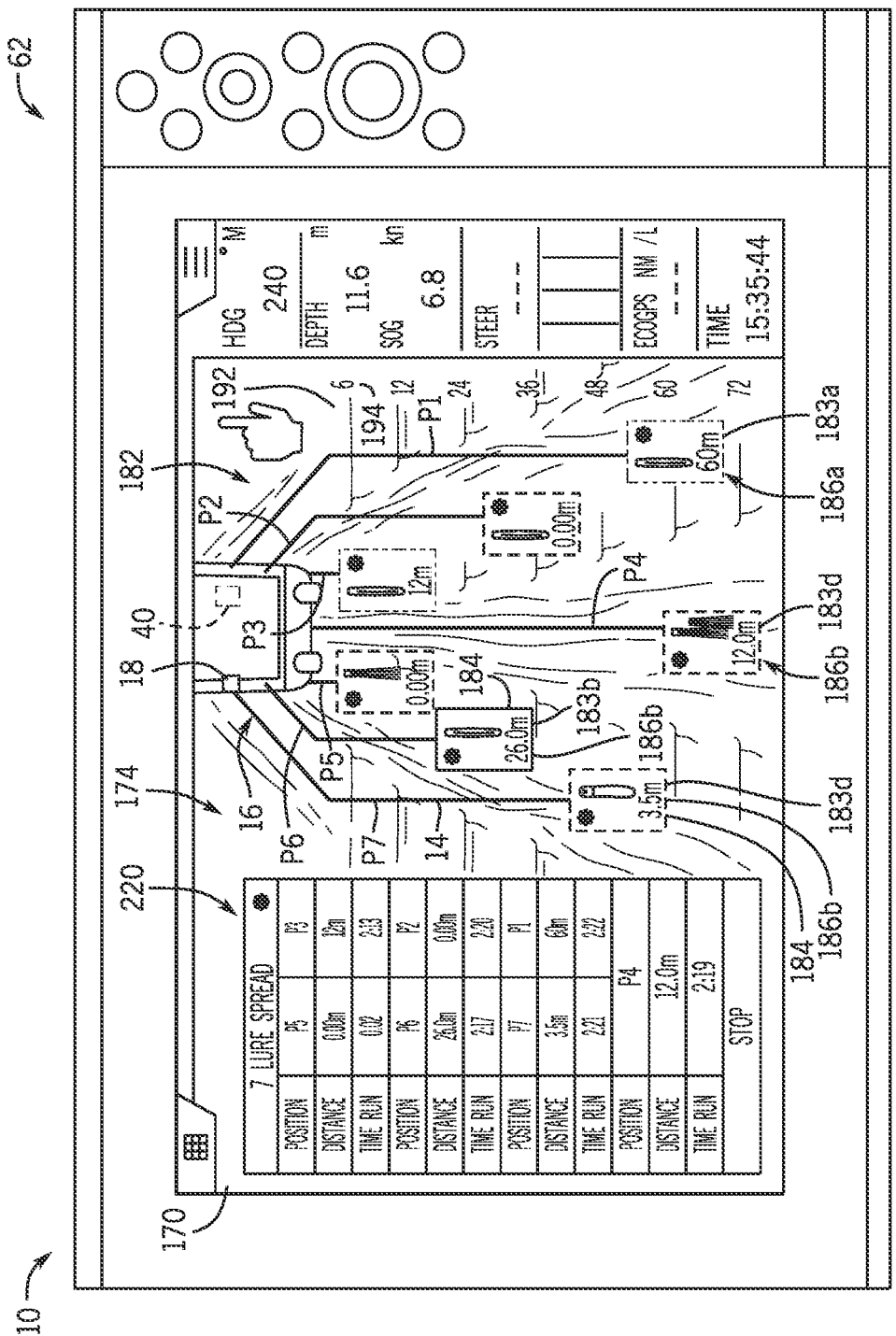
FIG. 9 depicts a fourth screen of a graphic display generated according to the present disclosure.

With reference to FIG. 9, the system 10 may also be configured to graphically display on the GUI 170 when a fishing lure 12 is not in the expected location, or in other words has a line length that varies from the target distance from the marine vessel 1 associated with that spread 174 for that position. In particular, FIG. 9 shows a fourth manner of displaying the outlines of information boxes 184 for the fishing lures 12. Here, the outline 183d for position P7 as a thicker dashed line versus the outline 183a of position P1. The outline 183d of position P7 indicates that the numeric value 186b varies by more than a threshold difference from the target distance associated with that spread 174, which here is approximately 48 m. This indicates to the operator that the fishing lure 12 of position P7 should be checked since it is out of the expected location for the spread. The threshold difference is also exceeded for the fishing lures 12 of positions P2, P4, and P5, which are also shown with this type of outline 183d. The threshold difference may be a fixed value such as 5.0 m, and/or a relative value such as 8% between the measured line length and the target distance for a given fishing lure 12.

The system 10 may also be configured such that the outlines 183d indicate which fishing lures 12 vary in position by more than a threshold amount relative to the pressure waves 192, in addition to or in the alternative to varying by more than a threshold amount relative to the marine vessel 1. For example, the operator may set up the system 10 to allow a threshold difference of up to 3.0 m between a given fishing lure 12 and the nearest pressure wave 192 (e.g., calculated by comparing the line length measurement to the distance 194 of the nearest pressure wave 192). This threshold may apply to an entire spread 174 or may be specific to a given position within the spread 174. Likewise, the thresholds for comparing the distances between the fishing lures 12 and the pressure waves 192 may be different than the thresholds for comparing the line lengths to the target distances between the fishing lures 12 and the marine vessel 1.

In the example of FIG. 9, the fishing lure 12 of position P6 has a line length of 26.0 m and the nearest pressure wave 192 has distance 194 from the marine vessel 1 of 24 m (thus, a difference of 2.0 m). If the threshold distance between the fishing lure 12 and the nearest pressure wave is set to 3.0 m, the fishing lure 12 of position P6 would be within the allowable threshold. Thus, the outline 183b for the information box 184 associated with position P6 would be shown to correspond to a normal, acceptable value (e.g., the outline having a standard line and/or being shown in green).

In contrast, the line lengths of the fishing lures 12 in positions P2, P4, P5, and P7 are not within the 3.0 m exemplary threshold of their nearest pressure waves 192. Therefore, the outlines 183d of information boxes 184 for positions P2, P4, P5, and P7 are shown to differ from the outline 183b of position P6, indicating that the operator should check these fishing lures 12. Written and/or verbal messages may also be provided, as described above. It will be recognized that the fishing lures 12 of positions P1 and P3 are still shown with a first type of outline 183a indicating that their corresponding line counters 18 are not communicating with the central control module 40. In this case, the line length information is not available to make a threshold comparison as the locations of the fishing lures 12 are unknown.

The present inventor has recognized that by automatically monitoring the locations of the fishing lures 12 relative to target distances to the marine vessel 1 and/or to target distances to pressure waves 192, the operator is able to make real-time adjustments to optimize performance and react to changes. Likewise, the present inventor has recognized that even where all fishing gear is stable and positioned perfectly with respect to pressure waves, the simple act of steering or changing the marine vessel 1 velocity can change the locations of the pressure waves 192, thereby throwing off the location of every fishing lure 12. The system 10 automatically detects the impacts of such changes in vessel speed and/or direction and alerts the operator to make the necessary adjustments. In certain embodiments, the system 10 may also automatically control any electric reels (i.e., reeling in or letting out the line 14) so as to position the fishing lures 12 within the threshold distances of the pressure waves 192 and/or the target distances associated with the spread 174.

Returning to FIG. 1, certain embodiments are further configured to monitor the steering rate of change at which the marine vessel 1 is steered. This may be monitored by comparing the steering rate of change received from the steering actuators 28 to a threshold rate, such as 1 degree/second. When the steering rate of change exceeds this threshold rate, which may also be a function of velocity and/or the line lengths measured for any lines 14 in the water, the system 10 may alert the operator of the risk of tangling. This alert may be a visual indication or message on the GUI 170 (e.g., FIG. 8), and/or a separate visual or auditory indication provided at the helm. The system 10 may cause certain reels 16 (e.g., the electric reel 161 shown in FIG. 5) to reel in the corresponding lines 14 to avoid such tangling when the steering rate of change exceeds the threshold rate. The system 10 may automatically let out the lines 14 again (e.g., to the previous line lengths, a target distance of line length relative to the marine vessel 1, and/or a target distance relative to the nearest pressure wave) when the threshold rate is no longer exceeded. The system 10 may also or alternatively silence any line length-based alarms while a turn is occurring since the locations of the fishing lures 12 may be temporarily incorrect but resolve themselves automatically.

With continued reference to FIG. 1, the system 10 may also use an object detection system comprising one or more image sensors 54 and corresponding image processors 53 to detect the locations of fishing lures 12 and/or pressure waves being the marine vessel 1. The image sensors 54 capture images, or data more generally, relating to objects and/or the environment on or around the marine vessel 1. Examples of image sensors 54 include proximity and/or vision-based sensors such as radars, sonars, LiDAR devices, cameras and/or stereo-vision cameras, lasers, and/or Doppler direction finders). Separate image sensors 54 may be provided for capturing objects that are on or in the marine vessel 1 versus those for capturing objects outside the marine vessel 1 (e.g., in the water surrounding the marine vessel). The images sensors 54 may also vary in type, field of view, focal distance, or mounting location on the marine vessel 1 accordingly.

Likewise, image sensors 54 may be positioned in different locations on the marine vessel 1 but with overlapping fields of view. In this overlapping configuration, data from multiple image sensors 54 may be processed together so as to provide redundancy, provide views of a same object from different angles, and/or to enable improve the accuracy of calculating distances (e.g., through triangulation techniques known in the art for processing images from two or more cameras). Overlapping fields of views may also be used to ensure that the entire area of interest outside the marine vessel 1 is covered, and/or to accommodate for any visual barriers on the deck 71 such as the ladder 74 or other structures.

In the system 10 of FIG. 1, two image sensors 54 are coupled to the tower 72. In this placement, the fields of view for the images sensors 54 capture the deck 71 and the areas aft and to the sides of the marine vessel 1 that are typically fished. In certain embodiments, each of the image sensors 54 coupled to the tower 72 face the stern 4 and have fields of view FOV between 120 and 270 degrees and focal distances between 0 m and 500 m The data from the image sensors 54 is provided as an input to one or more image processors 53 that process the data to that generate an image, make comparisons with previously generated images, identify patterns in the data or images, and/or detect objects within the data or images. In certain examples, the image processors 53, or the system 10 more generally, incorporates edge detection technology, computer vision machine learning (CVML), and/or an artificial neural network trained to detect patterns or predefined objects. A library of images pre-classified as corresponding to particular objects (e.g., various fishing lures 12, pressure waves, fish jumping out of the water, a deck, or the flag of a planar board) may be used for training or for the image processor 53, and/or as a reference for comparing to the data from the image sensors 54. The library may also include these objects in different states, such as planar boards with the flags up and with the flags down, labeled accordingly for subsequent reference. The system 10 may analyze the object relative to itself, and/or analyze the object relative to another object (e.g., relative to the marine vessel 1). Moreover, this determination may be based on a single image, and/or on changes in the images over time, such as comparing a current image with the previously captured image of that image sensor 54.

With continued reference to FIG. 1, the system 10 may also incorporate information relating to the size, shape, or color of features captured by the image sensors 54 to detect an object. For example, determining that an object of interest is brown makes that object more likely to be water rather than a flag of a planar board, which is designed to be visually stand out from the water. In other embodiments, computer vision techniques are used to compare images from the image sensors 54 to each other and/or to pre-classified examples stored in the memory system 120.

The system 10 may also be configured to automatically match a connected line counter 18 with its the position relative to the marine vessel. For example, the system 10 may detect the location of the operator as a line counter 18 becomes active, assuming that the operator activated the line counter 18. The system 10 may also use used to monitor the locations of the lines 14 so as to warn the operator before tangling occurs.

Figure 10:
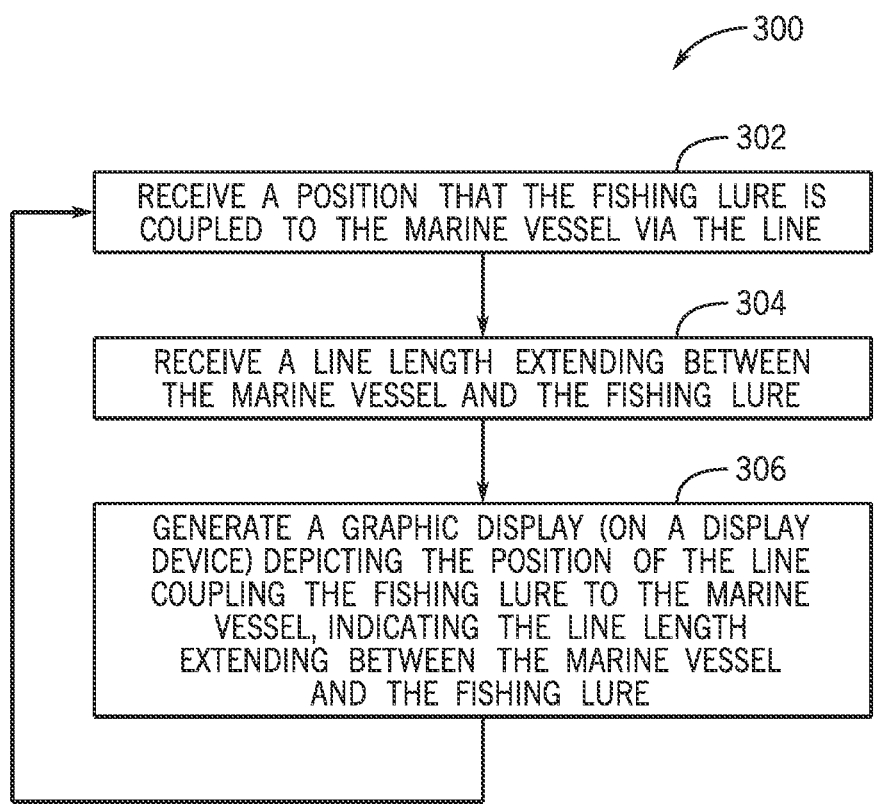
FIG. 10 is a flow chart for a first method for monitoring fishing lures according to the present disclosure.

FIGS. 10-13 depict exemplary methods for monitoring fishing lures according to the present disclosure. In particular, step 302 in the method 300 of FIG. 10 provides for receiving a position that the fishing lure is coupled the marine vessel via a line, whereby the position is relative to the marine vessel (e.g., positions P1-P7 of FIGS. 3-9). Step 314 provides for receiving a line length that extends between the marine vessel and the fishing lure. In step 316, a graphic display is generated on a display device, whereby the graphic display depicts the position of the line coupling the fishing lure to the marine vessel. The graphic display is also generated so as to indicate the line length extending between the marine vessel and the fishing lure as received in step 314.

Figure 11:
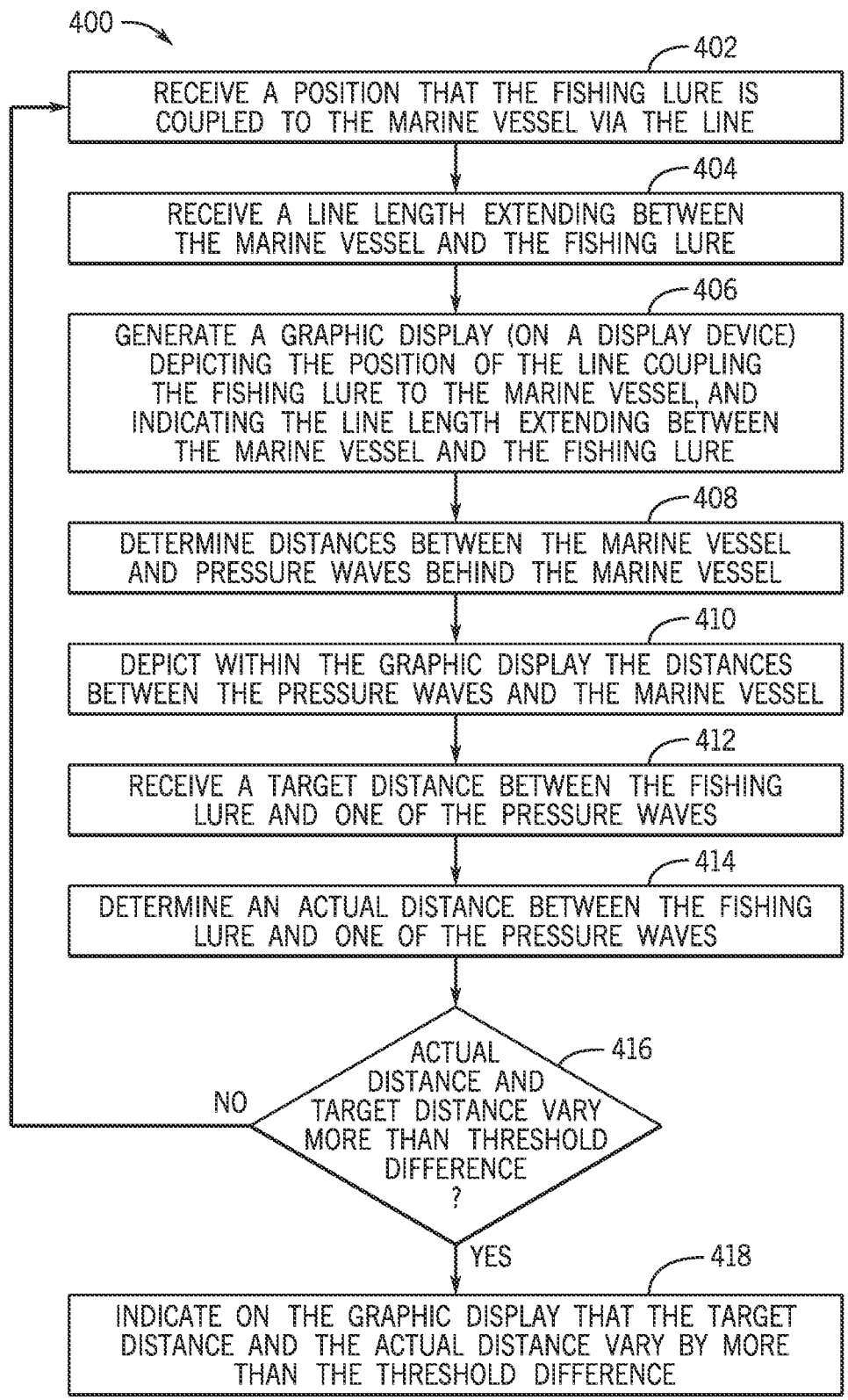
FIG. 11 is a flow chart for a second method for monitoring fishing lures according to the present disclosure.

FIG. 11 shows another exemplary method 400 for monitoring a fishing lure according to the present disclosure. Steps 402 through 406 correspond to steps 302 through 306 of the method 300 shown in FIG. 10. Step 408 then provides for determining distances between the marine vessel and pressure waves behind the marine vessel. As discussed above, these distances may be calculated based on the length, beam, draft, weight, and/or other aspects of the marine vessel's hull, may be determined empirically, and/or may be determined through use of image sensors. Step 410 provides for depicting the pressure waves behind the marine vessel within the graphic display. A target distance between the fishing lure and one of the pressure waves is received in step 412, which may be entered by the operator and/or stored in the memory system. An actual distance between the fishing lure and the pressure wave is determined in step 414, whereby a difference between the actual and target distance is then compared to a threshold difference in step 416. If the difference between the actual distance and the target distance between the fishing lure and the pressure wave does not exceed the threshold difference, the method 400 returns to step 402. If instead the difference is found to exceed the threshold difference in step 416, step 418 provides for indicating on the graphic display that the target distance and the actual distance vary by more than this threshold amount. As discussed above, this indication may take many forms, such as changing the outline of an information box (e.g., flashing versus solid, or changes in color, line style, thickness, etc.), and/or written or audible messages to the operator.

Figure 12:
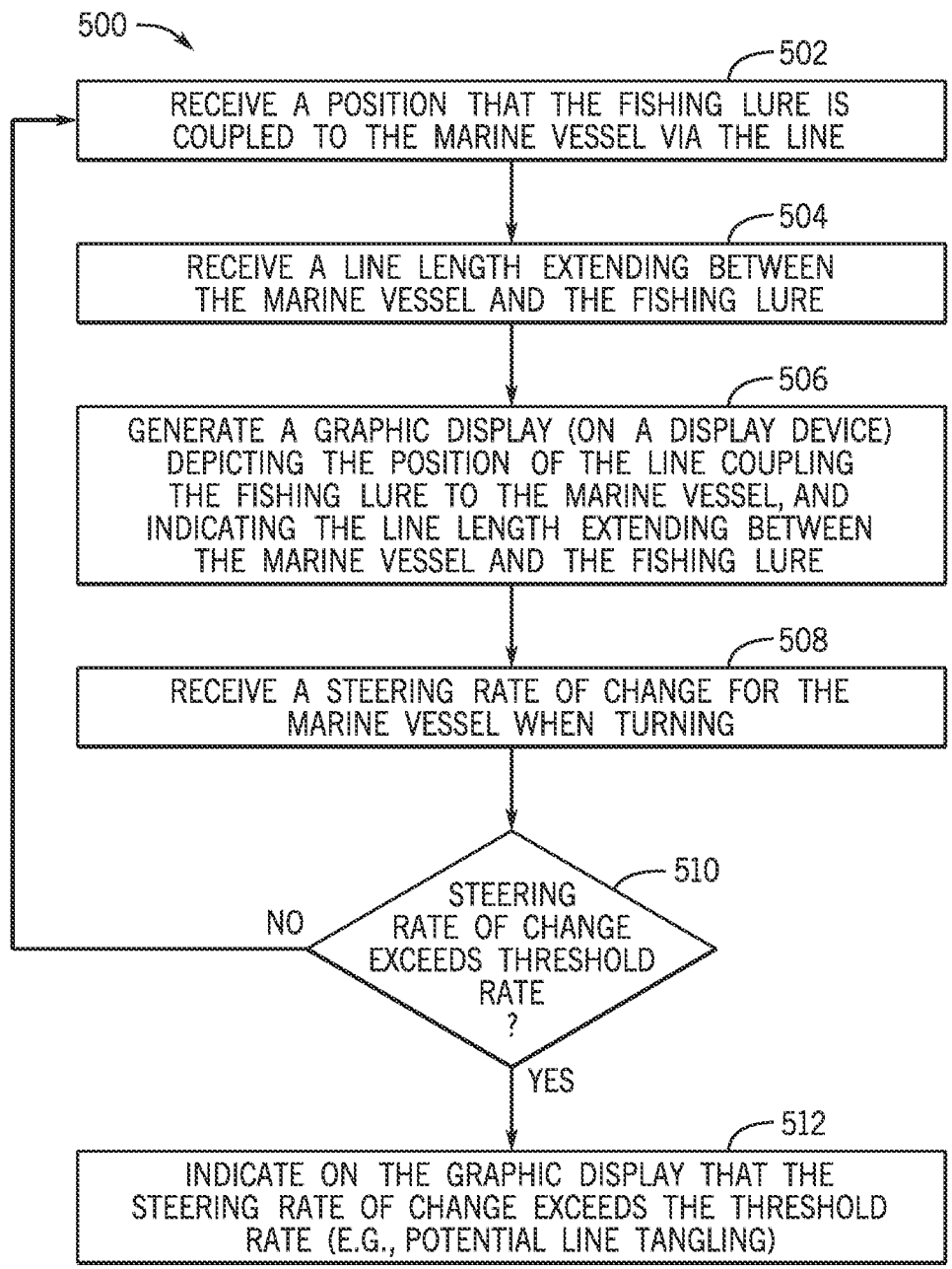
FIG. 12 is a flow chart for a third method for monitoring fishing lures according to the present disclosure.

FIG. 12 shows another exemplary method 500 for monitoring a fishing lure according to the present disclosure. Steps 502 through 506 correspond to steps 302 through 306 of the method 300 shown in FIG. 10. Step 508 then provides for receiving a steering rate of change for the marine vessel when turning. The steering rate of change may be received from a steering actuator and/or a steering wheel or other user input mechanism for steering control, or by monitoring a change in position via GPS tracking. Step 510 compares the steering rate of change from step 508 to a threshold rate stored in the memory system. Examples of threshold rates were discussed above and may include fixed or relative values. If the steering rate of change is found in step 510 to not exceed the threshold rate, the method 500 returns to step 502. If instead the steering rate of change is found to exceed the threshold rate in step 510, step 512 provides for indicating on the graphic display that the steering rate of change exceeds the threshold rate. As discussed above, this indication may take many forms, such as changing the outline of an information box (e.g., flashing versus solid, or changes in color, line style, thickness, etc.), and/or written or audible messages to the operator. The method may further include automatically controlling electric reels with the control system to reel in any lines expected to become tangled, and in certain examples controlling the electric reels to let the lines back out when the threshold rate is no longer exceeded.

Figure 13:
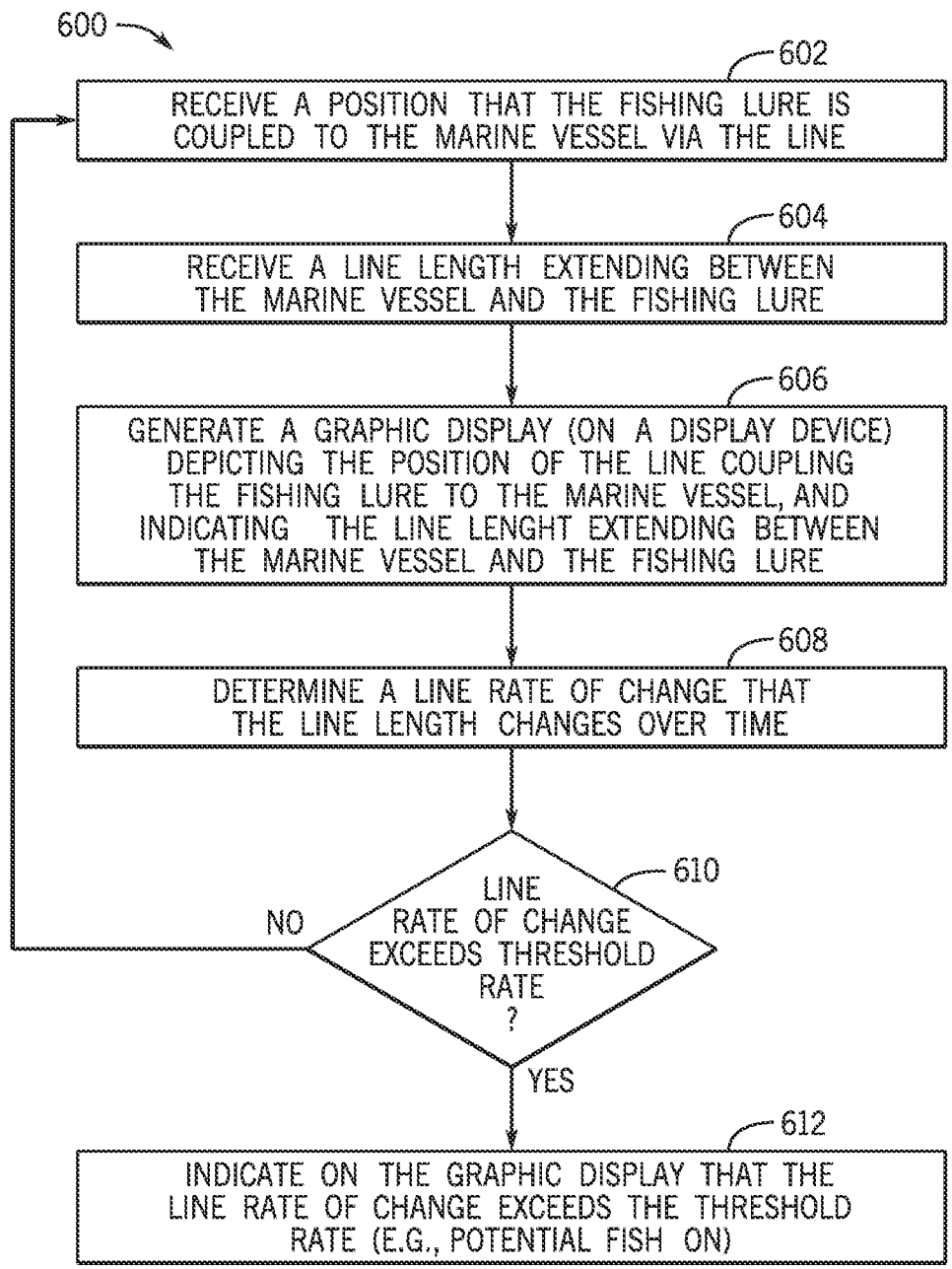
FIG. 13 is a flow chart for a fourth method for monitoring fishing lures according to the present disclosure.

FIG. 13 shows another exemplary method 600 for monitoring a fishing lure according to the present disclosure. Steps 602 through 606 correspond to steps 302 through 306 of the method 300 shown in FIG. 10. Step 608 then provides for determining a line rate of change that the line length changes over time, such as via the techniques described above. Step 610 compares the line rate of change from step 608 to a threshold rate stored in the memory system. Examples of threshold rates are discussed above and may include fixed or relative values. If the line rate of change is found in step 610 to not exceed the threshold rate, the method 600 returns to step 602. If instead the line rate of change is found to exceed the threshold rate in step 610, step 612 provides for indicating on the graphic display that the line rate of change exceeds the threshold rate. As discussed above, this indication may take many forms, such as changing the outline of an information box (e.g., flashing versus solid, or changes in color, line style, thickness, etc.), and/or written or audible messages to the operator.

In this manner, the systems and methods disclosed herein address the unmet needs of assisting an operator in monitoring fishing lures coupled to a marine vessel.

The functional block diagrams, operational sequences, and flow diagrams provided in the Figures are representative of exemplary architectures, environments, and methodologies for performing novel aspects of the disclosure. While, for purposes of simplicity of explanation, the methodologies included herein may be in the form of a functional diagram, operational sequence, or flow diagram, and may be described as a series of acts, it is to be understood and appreciated that the methodologies are not limited by the order of acts, as some acts may, in accordance therewith, occur in a different order and/or concurrently with other acts from that shown and described herein. For example, those skilled in the art will understand and appreciate that a methodology can alternatively be represented as a series of interrelated states or events, such as in a state diagram. Moreover, not all acts illustrated in a methodology may be required for a novel implementation.

This written description uses examples to disclose the invention, including the best mode, and also to enable any person skilled in the art to make and use the invention. Certain terms have been used for brevity, clarity, and understanding. No unnecessary limitations are to be inferred therefrom beyond the requirement of the prior art because such terms are used for descriptive purposes only and are intended to be broadly construed. The patentable scope of the invention is defined by the claims and may include other examples that occur to those skilled in the art. Such other examples are intended to be within the scope of the claims if they have features or structural elements that do not differ from the literal language of the claims, or if they include equivalent features or structural elements with insubstantial differences from the literal languages of the claims.

What is claimed is:

1. A method for monitoring a fishing lure coupled to a marine vessel via a line, the method comprising:
   receiving a position with respect to the marine vessel in which the fishing lure is coupled to the marine vessel via the line;
   receiving a line length of the line extending between the marine vessel and the fishing lure when the fishing lure is in use outside the marine vessel; and
   generating a graphic display on a display device, wherein the graphic display depicts the position of the line coupling the fishing lure to the marine vessel, and wherein the graphic display indicates the line length extending between the marine vessel and the fishing lure, further comprising determining a distance between the marine vessel and a pressure wave based at least in part on a vessel speed of the marine vessel.

2. The method according to claim 1, wherein the position in which the fishing lure is coupled to the marine vessel via the line is a first position in which a first fishing lure is coupled to the marine vessel via a first line, further comprising receiving additional positions in which additional fishing lures are coupled to the marine vessel via additional lines, wherein the first position and the additional positions vary laterally from each other with respect to the marine vessel and remain unchanged relative to the marine vessel by the marine vessel moving in water;

receiving additional line lengths of the additional lines extending between the marine vessel and the additional fishing lures, respectively, when the additional fishing lures are in use outside the marine vessel; and generating the graphic display on the display device to depict, the additional positions of the additional lines coupling the additional fishing lures to the marine vessel so as to be laterally distinguishable from each other with respect to the marine vessel, and to indicate the additional line lengths extending between the marine vessel and the additional fishing lures so as to assist in monitoring the additional fishing lures while the marine vessel moves in the water.

3. The method according to claim 1, further comprising receiving the line length from a line counter operatively coupled to the line, wherein the line counter measures the line length.

4. The method according to claim 3, further comprising receiving the line length from the line counter wirelessly via a wireless transceiver.

5. The method according to claim 1, further comprising updating the graphic display when the line length changes.

6. The method according to claim 1, further comprising receiving a target distance between the marine vessel and the fishing lure, comparing the line length to the target distance, and indicating on the graphic display when the line length and the target distance differ by more than a threshold difference.

7. The method according to claim 1, further comprising updating the pressure wave depicted on the graphic display as the vessel speed changes.

8. The method according to claim 1, further comprising receiving a steering rate of change for the marine vessel when turning, comparing the steering rate of change to a threshold rate, and indicating on the graphic display when the steering rate of change exceeds the threshold rate so as to warn of possible tangling of the line with other lines coupled to the marine vessel.

9. The method according to claim 8, wherein the threshold rate is based at least in part on the line length of the line extending between the marine vessel and the fishing lure.

10. The method according to claim 1, further comprising determining a line rate of change at which the line length changes over time, and generating an indication on the graphic display when the line rate of change exceeds a threshold rate so as to indicate a potential catch on the fishing lure.

11. A method for monitoring a fishing lure coupled to a marine vessel via a line, the method comprising:

receiving a position with respect to the marine vessel in which the fishing lure is coupled to the marine vessel via the line;

receiving a line length of the line extending between the marine vessel and the fishing lure when the fishing lure is in use outside the marine vessel; and generating a graphic display on a display device, wherein the graphic display depicts the position of the line coupling the fishing lure to the marine vessel, and wherein the graphic display indicates the line length extending between the marine vessel and the fishing lure, further comprising receiving a target distance between the fishing lure and a pressure wave, determining an actual distance between the fishing lure and the pressure wave, and indicating when the target distance and the actual distance differ by more than a threshold difference.

12. A system for monitoring fishing lures coupled to a marine vessel via lines while the marine vessel moves in water, the marine vessel extending laterally from a port side to a starboard side, the system comprising:

a display device; and a control system configured to:

receive positions with respect to the marine vessel in which the fishing lures are coupled to the marine vessel via the lines, wherein the positions vary laterally with respect to the marine vessel and remain unchanged by the marine vessel moving in the water;

receive line lengths of each of the lines extending between the marine vessel and the fishing lures when the fishing lures are in use outside the marine vessel;

determine a distance between the marine vessel and a pressure wave based at least in part on a vessel speed of the marine vessel; and control the display device to generate a graphic display depicting the positions of the lines coupling the fishing lures to the marine vessel and indicating the line lengths and indicating the pressure wave and/or the distance between the marine vessel and the pressure wave, wherein the positions of the lines are depicted to vary laterally with respect to the marine vessel so as to assist in monitoring the fishing lures while the marine vessel moves in the water.

13. The system according to claim 12, wherein the control system is further configured to receive target distances between the marine vessel and the fishing lures, to compare the line lengths extending between the marine vessel and the fishing lures to the target distances, respectively, and to cause the display device to indicate on the graphic display when the line lengths and the target distances differ by more than threshold differences.

14. The system according to claim 12, further comprising line counters operatively coupled to the lines, wherein the line counters are configured to measure the line lengths extending between the marine vessel and the fishing lures, respectively.

15. The system according to claim 14, wherein the line counters are configured to wirelessly communicate with the control system such that the control system automatically receives the line lengths from the line counters, and wherein the control system causes the display device to update the graphic display when the line lengths received from the line counters change.

16. The system according to claim 12, wherein the control system is further configured to cause the display device to generate the graphic display to depict the pressure wave the distance behind the marine vessel, and wherein the control system is configured to receive target distances between the fishing lures and the pressure wave, to determine actual distances between the fishing lures and the pressure wave, and to cause the display device to indicate on the graphic display when the target distances and the actual distances differ by more than a threshold difference, respectively.

\* \* \* \* \*